G. J. FITZPATRICK.
VOUCHER SHEET.
APPLICATION FILED APR. 30, 1912.

1,068,118.

Patented July 22, 1913.

UNITED STATES PATENT OFFICE.

GEORGE J. FITZPATRICK, OF CHICAGO, ILLINOIS.

VOUCHER-SHEET.

1,068,118.   Specification of Letters Patent.   Patented July 22, 1913.

Application filed April 30, 1912. Serial No. 694,113.

*To all whom it may concern:*

Be it known that I, GEORGE J. FITZPATRICK, a citizen of the United States, residing at Chicago, in the county of Cook and State of Illinois, have invented certain new and useful Improvements in Voucher-Sheets, of which the following is a specification.

The present invention relates to a sheet of paper having a series of printed surfaces thereon separated and divided from one another by lines of tear, said sheet constituting as a whole a voucher sheet embodying a form of check and a series of ledger or data sheets.

The principal objects of the present invention are, to arrange a voucher sheet so that the payer of a check can determine from the data upon the various portions of the voucher sheet the condition of his bank account; can determine by a quick observation thereof whether it is desirable to remit the check at that time; and can also determine the total amount of expenditures to date, the account credit of a particular party, and the account debit of a particular party.

A further object of the invention is to form a series of lines of tear in the sheet, whereby it may be separated into different sections, and to arrange the printed matter upon each of said sections in conformity with the usage to which the section is to be put.

The invention further consists in the features of construction and in the combination of parts hereinafter described and claimed.

In the drawings, Figure 1 is a view of the face of the voucher of the present invention; and Fig. 2, a view of the back of said voucher.

As illustrated in the drawings, a horizontally extending line of tear 3 is made in said voucher sheet by means of a series of perforations or other analogous means; and the portion 4, below said line of tear, has printed matter thereon arranged in a manner to provide a bank check. The portion 5, above the line of tear 3, is subdivided by a line of tear 6, which extends to the line of tear 3, as clearly indicated in the figures of the drawing. The space 7, to the left of the line of tear 6 and extending to the line of tear 3, is printed to provide a memoranda sheet for recording reimbursements.

By referring to the space 7, as illustrated in Fig. 1, under the heading "Cash debit," it will be seen that the notations thereon indicate a balance brought forward of $11,800.00, and that a reimbursement from the Roe stock farm of $7,905.83 has been received, making the balance $19,705.83. Thus, the payer, by glancing at this portion of the voucher, can readily see the total amount of his bank deposits to date. Again referring to the above space, under the heading "Account credit," it will be seen that the notations thereon indicate a reimbursement from the Roe stock farm of $7,905.83 has been received, in addition to a remittance of $1,000.00 already made, making the total received from this source $8,905.83. Thus, the payer, by glancing at this portion of the voucher, can readily determine the total amount of money the Roe stock farm has given him to date.

The space 8 is arranged to receive disbursements under the headings "Account debit" and "Cash credit." Under the heading, "Account debit," it will be seen that the notations thereon indicate a balance brought forward of $2,000.00, and that the present disbursements to John Doe of $150.00 has been paid, making a total of $2,150.00 disbursements to John Doe. Thus, the payer, by glancing at this portion of the voucher, can readily see that the total amount of money paid John Doe to date is $2,150.00

Referring to the space 8, under the heading "Cash credit," it will be seen that the notations thereon indicate the present disbursement to be for the sum of $150.00, and by subtracting this amount from the sum of $9705.83, which represents the cash on hand, a balance of $9555.83 will be obtained, representing the balance on hand after the payment has been made. By looking at this heading the present state of the payer's bank account can be determined. If, by glancing at these figures, he should determine that a larger disbursement could be made, or that the payment should be smaller, he can make notations to that effect and send the voucher sheet back to be remade. It is understood that at all times the amount of the check and the amount noted under "Disbursements—this check" must be the same. By subtracting from the cash debit balance the cash credit balance, the payer can immediately ascertain his total expenditures to date, as illustrated on voucher #740, as follows:

Reimbursement stub—cash debit balance.............. $19,705.83
Disbursement stub—cash credit balance................ 9,555.83

Payer's total expenditure to date................ $10,150.00

Thus, the payer, by making this subtraction, can in a moment's time ascertain what his total expenditures have been to date.

The back 9 of the reimbursement sheet is arranged in the form of a ledger sheet, showing credits, and is used as a journal distribution to show an itemized account of the deposit; and, as illustrated in Fig. 2 of the drawings, the memorandum thereon shows a credit of $7905.83 from the Roe stock farm for 1500 head of cattle. This whole reimbursement stub after it has been torn from the rest of the voucher is to be used in a card index for future rapid reference. The back 10 of the disbursement sheet is arranged in the form of a ledger sheet to show debits, and contains reference for journal distribution; and, as illustrated in Fig. 2 of the drawings, the memorandum thereon shows a debit of $150.00 to John Doe for auto repairs. These credit and debit memoranda, as will be seen, tally with the reimbursement and disbursement memoranda respectively. This whole disbursement stub after it has been torn from the rest of the voucher is to be used in a card index for future rapid reference. The backs of both stubs when not separated are to be used as loose-leaf ledger sheets. The fronts of both stubs when not separated are to be used as loose-leaf voucher check stubs. The back 11 of the check is arranged to receive a memorandum of what the payment made by the check covers, so that a complete receipt is given when the payee indorses the check.

After the check has been filled out by the payer, he can then separate it from the balance of the sheet along the line of tear 3, and it then becomes a voucher check; and he can separate the reimbursement and disbursement sheets along the line of tear 6, thus separating the voucher into three different sections. The check would, of course, be sent to the payee, and the reimbursement and disbursement sheets could be filed away in any suitable manner for future reference.

By the arrangement outlined, the printed matter above the line 3, which might be said to constitute the stub of the check, can be utilized as leaves of a card index or loose-leaf bookkeeping system; and a complete record of each checking transaction is maintained in a compact form for ready reference.

The voucher of the present invention is particularly adapted to be transported from place to place by traveling auditors, timekeepers, etc., and it enables them to keep a complete transaction of all payments and reimbursements without the necessity of cumbersome and heavy books ordinarily employed for keeping track of such transactions.

I claim:

A voucher of the class described, provided with a line of separation extending from edge to edge thereof, and provided with a second line of separation extending at right angles to the first mentioned line and meeting said first line at approximately its longitudinal center, whereby the sheet is divided into three sections, one section extending from side to side of the sheet, and the other two sections extending respectively from the second line of separation to the side of the sheet, the section extending from side to side of the sheet being arranged in the form of a voucher bank check, one of the sections extending from the second line of separation to the side of the sheet being arranged on one side with a column to receive account credits, and on the other side with a column to receive cash debits, and the other of said sections being provided on one side with a column to receive account debits, and the other side with a column to receive cash credits, the backs of said latter two sections being provided respectively with columns to receive itemized statements of the account credit and account debit, substantially as described.

GEO. J. FITZPATRICK.

Witnesses:
 Wm. P. Bond,
 Mary R. Frost.